United States Patent Office 3,360,908
Patented Jan. 2, 1968

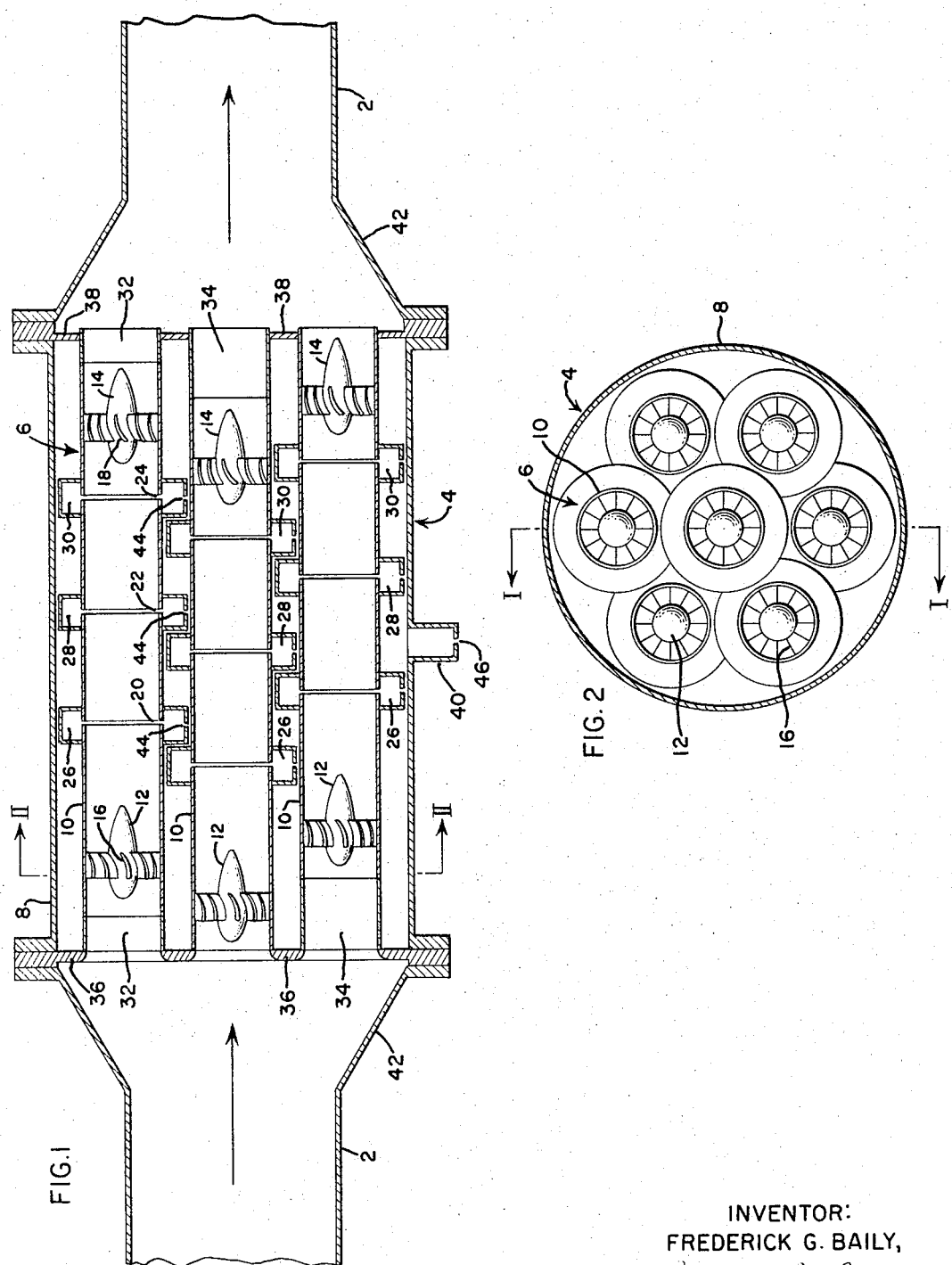
Jan. 2, 1968     F. G. BAILY     3,360,908
NESTED VORTEX SEPARATOR
Filed Aug. 15, 1966
INVENTOR:
FREDERICK G. BAILY,
BY *Robert J. Bird*
HIS ATTORNEY.

3,360,908
NESTED VORTEX SEPARATOR
Frederick G. Baily, Ballston Spa, N.Y., assignor to General Electric Company, a corporation of New York
Filed Aug. 15, 1966, Ser. No. 572,292
6 Claims. (Cl. 55—347)

ABSTRACT OF THE DISCLOSURE

Plurality of vortex separator elements nested in common casing.

This invention relates to improvements in devices for effecting the separation of suspended material from gases or vapors by centrifugal or vortical action.

Centrifugal or vortical separators are known wherein a vortical swirl is imparted to a fluid flow by means of a set of swirl vanes, and particles or droplets entrained therein are motivated to the outer periphery of the vortex by centrifugal action and then collected by draining through suitable apertures in the walls of the vortex flow chamber. These separators are typically used to remove moisture from steam systems, or to remove particles from air systems. One example of such a separator is disclosed in co-pending patent application S.N. 547,697, filed Apr. 7, 1966 in the name of E. L. Lustenader, and assigned to the assignee of the present application. The vortical separator therein disclosed is generally used singly in a pipeline having the same diameter as the separator, which is constructed as its own pressure vessel. Because of the fact that such separators have inherent length to diameter ratios and since they are their own pressure vessels, they are required to be very long when used in applications as, for example, moisture removal in the piping between high and low pressure casings of nuclear steam turbines, where the pipe diameters are very large. Furthermore, for any such single unit, there is an optimum size range beyond which the effectiveness of the apparatus is reduced as the diameter increases.

Accordingly, it is an object of the present invention to provide a vortex separator for use in large pipeline applications which is relatively economical to manufacture and maintain.

Another object is to provide such a vortex separator in which the separator elements are not pressure vessels.

Another object is to provide such a vortex separator in a unit smaller than any prior art separators of the same capacity.

Another object is to provide such a separator having improved separating effectiveness accompanied by low pressure drop.

Other objects, advantages and features of the present invention will become apparent from the following description of a preferred embodiment thereof when taken in connection with the accompanying drawing.

Briefly stated, the present invention is practiced in one form by a plurality of vortex separator elements mounted in parallel relationship in a single pressure vessel. The separator elements are nested together in a polygonal array and arranged slightly axially offset relative to each other so that their extraction rings overlap and do not interfere, thus conserving cross-sectional space. The single pressure vessel in which the elements are mounted communicates at each of its ends with the fluid pipeline.

In the drawing:

FIG. 1 is a longitudinal elevation, partly in section, of a nested vortex separator according to the present invention.

FIG. 2 is an axial view taken along the line II—II of FIG. 1.

Referring now to FIG. 1 of the drawing, a piping system, such as, for example, the piping between high and low pressure casings of steam turbines, is generally indicated at 2. At some point in the piping system 2, the piping is interrupted and modified for the installation therein of a separator generally indicated at 4. Separator 4 includes seven individual vortical separator elements generally indicated at 6, which are arranged on parallel axes in a hexagonal array within a common cylindrical casing 8. FIGS. 1 and 2 together show this clearly.

Still referring to FIG. 1, and in particular to a single vortical separator element 6, the structure and operation of a single separator element 6 which is identical to all the others, will be described. Separator element 6 includes a generally cylindrical casing 10 which is open at both ends. In each end portion of casing 10 is a streamlined hub which is centrally disposed within the cylinder defined by casing 10 and having a series of vanes mounted in a generally radial direction therearound. Hub 12 on the inlet end of casing 10 carries swirl vanes 16 and hub 14 on the outlet end carries de-swirl vanes 18. Disposed between swirl vanes 16 and de-swirl vanes 18, is a series of longitudinally spaced annular collecting slots or apertures 20, 22 and 24, the exact number being immaterial to the present invention. The annular slots or apertures 20, 22 and 24 permit communication between the interior of separator casing 10 and annular collecting chambers 26, 28 and 30 respectively, which chambers are circumferentially disposed around casing 10. Chambers 26, 28 and 30 in turn have a drain opening 44 in their bottom portions which communicates with the interior of casing 8.

The operation of the individual vortical separator element 6 is as follows: A vortex swirl is imparted to an incoming two-phase mixture as, for example, steam and water, by swirl vanes 16. Water droplets move to the outer wall 10 due to the centrifugal force in the vortical swirl and exit through slots 20, 22 and 24. The water droplets are collected in annular collecting chambers 26, 28 and 30. The drier vapor remaining within the casing 10 proceeds axially to the de-swirl vanes 18 which remove the vortical swirls from the flowing vapor. Moisture collected in annular chambers 26, 28 and 30 drains by gravity action through drain openings 44 into the interior of casing 8. The above described structure and operation are all disclosed in the aforementioned application Ser. No. 547,697.

Referring now to FIG. 1, identical separator elements 6 are arranged in a closely nested hexagonal array within a common cylindrical separator casing 8. The elements 6 are identical and are axially staggered so that collecting chambers 26, 28 and 30 on adjacent elements do not interfere. This maximizes the use of space within cylindrical casing 8 or, conversely, minimizes the necessary diameter of casing 8. The axial staggering of elements 6 is achieved by the use of appropriate extensions at the inlet and/or the outlet ends of elements 6 as required. These extensions may be separate elements as shown at 32 and 34, welded or otherwise fixed to form part of element 6. Or, the extensions may be integral parts of the element pipe.

In the embodiment shown in FIG. 1, having seven separator elements 6, two sizes of spacer cylinders are shown. These are designated 32 for the smaller, and 34 for the larger size spacer cylinder. It will be apparent that cylinder 32 will have substantially the same axial dimension as collecting chambers 26, 28 and 30 with a slight addition for clearance. Cylinders 34 will be approximately twice that length. Thus, adjacent separator elements 6 are longitudinally displaced relative to each other by substantially the length of one (or two) collecting chambers.

The requirement for three different axial positions of the collecting chambers 26, 28, 30 in order to provide nesting in the least space in the preferred embodiment using seven separators will be apparent from a consideration of the geometry. The outer separators must be axially offset by the axial length of one collecting chamber in order to nest with the central inner separator and then the outer separators must be axially offset from each other by another collecting chamber axial length and in addition comprise an even number in order to nest with each other. This inherently favors an odd number of total separators and if they are of equal diameter, seven separators will nest in the minimum space with the least number of axial offsettings.

Separator 4 has sheets 36 and 38 on the inlet and outlet ends thereof at the open ends of cylindrical casing member 8. Inlet and outlet sheets 36 and 38 constitute the end support means for separator elements 6. These elements are fixedly mounted as by welding or rolling to one sheet, generally sheet 36, and movably mounted to the opposite sheet for accommodating thermal expansion. Sheets 36 and 38 also segregate the interior of casing 8 from the piping system 2. That is to say, that the flow from piping 2 goes only through separator elements 6. The space within casing 8 is drain space, which empties through a drain passage 40, through an orifice 46 or other suitable means to maintain back pressure within casing 8, into a suitable external collection location not shown. As shown in FIG. 1, the diameter of casing 8 is greater than thta of piping 2. A transition member 42 at each end of separator 4 suitably connects the separator to the piping system 2.

The operation of the above described nested vortex separator is essentially the same as that of each of the individual separator elements 6 acting by itself as above described with the additional feature of operation being that collection chambers 26, 28 and 30 of individual separator elements 6 drain into the common casing 8 which in turn drains through passage 40 into a suitable collection means. Orifice 46 maintains back pressure within casing 8 so that there is very little pressure difference across the walls of element casings 10, the casing 8 being the pressure vessel.

The inherent characteristics of individual vortical separators are such that there are practical limitations on their diameter. Aerodynamic effects favor smaller diameters. Thus, though there may be a practical size limitation for single element vortex separators, the present invention, by utilizing an unlimited number of smaller elements, enables the vortex separation principle and apparatus to be employed in virtually any size fluid line or conduit.

Another inherent characteristic of vortex separators is a relationship of length to diameter which, while not constant, is not variable over a wide range. Thus, it will be appreciated that the smaller diameter separator elements 6 of the present invention are much shorter than a single element vortex separator of the same capacity if their length to diameter ratios remain the same, and therefore the over-all separator 4 is much shorter.

The common separator casing 8 and the transition members 42 constitute the pressure vessel of the nested vortex separator of this invention. That is to say, that individual separator elements 6 do not in themselves constitute pressure vessels as is necssary of single element vortex separators. The separating elements 6 thus may be constructed of thin stock and of such quality materials as stainless steel for corrosion and erosion resistance without undue material cost.

It will be apparent that the foregoing description has disclosed a nested vortex separator which is capable of use in any size fluid conduit, while at the same time providing economies in size, space and materials.

While the foregoing description was directed toward a nested vortex separator having seven individual separator elements therein, the inventive concept obviously applies to any number of individual separator elements arranged within a cylindrical casing and the aforementioned hexagonal array is not limiting. For a given pipeline application, sizes of indivdual separator elements and the number of individual elements within the combined or nested separator will present only a matter of geometry to arrive at an optimum configuration.

A preferred embodiment of the present invention has been shown and described, but it may occur to others of ordinary skill in the art to make modifications of the present invention which will lie within the concept and scope thereof. For example, it may be desirable to provide a larger drain cavity at the bottom of casing 8, thus departing from a uniform cross-sectional shape of the casing. Accordingly, it is intended that the invention be not limited by the details in which it has been described but that it encompass all within the purview of the following claims.

What I claim as new and desire to secure by Letters Patent of the United States is:

1. A combined vortex separator including a plurality of individual vortex separator elements disposed in parallel relationship within a common casing, said elements each comprising a cylindrical casing having a first diameter and at least one annular collecting chamber of a second and larger diameter disposed around and in communication with the interior of said cylindrical casing, all of said first diameters being substantially equal and all of said second diameters being substantially equal, each of said elements further comprising swirl vanes mounted within its casing inlet portion and de-swirl vanes mounted within its casing outlet portion said collecting chambers of adjacent separator elements being axially offset permitting said elements to be positioned so that the distance between their centerlines is less than said second diameter, and means to mount said elements in fixed position within said common casing.

2. A combined vortex separator according to claim 1 in which the wall thickness of said common casing is greater than the wall thickness of the cylindrical casings of said elements.

3. The combination according to claim 1 wherein said common casing is cylindrical and wherein said elements are of uneven number disposed with an even number of outer elements in cylindrical array about a central element, and wherein the outer element collecting chambers are all axially offset from the central element collecting chamber and each outer element collecting chamber is additionally axially offset from adjacent outer element collecting chambers.

4. The combination according to claim 3 wherein said elements are seven in number.

5. A combined vortex separator having a plurality of individual vortex separator elements disposed in parallel relationship within a common casing, said elements each comprising a cylindrical casing having a minor diameter and a plurality of annular collecting chambers of a major and larger diameter disposed around and in communication with the interior of said cylindrical casing, said elements each further comprising swirl vanes mounted within its casing inlet portion and de-swirl vanes mounted within its casing outlet portion, said collecting chambers of adjacent separator elements being axially offset, permitting said elements to be positioned so that the collecting chambers of one element radially overlap the collecting chambers of adjacent elements, said common casing comprising an apertured sheet member at each end portion thereof, said elements extending longitudinally between said sheets and through said apertures and being fixedly mounted relative to one of said sheets.

6. A combined vortex separator according to claim 5 in which said minor diameters of said casings are equal and said major diameters of said collecting chambers are equal.

References Cited

UNITED STATES PATENTS

| | | | |
|---|---|---|---|
| 1,338,143 | 4/1920 | McGee | 55—347 X |
| 2,201,301 | 5/1940 | Richardson | 55—397 |
| 2,569,909 | 10/1951 | Umney | 55—347 X |
| 2,662,610 | 12/1953 | Heinrich | 55—347 |
| 3,086,343 | 4/1963 | Stern | 55—346 X |
| 3,253,999 | 5/1966 | Weisman | 55—348 X |

FOREIGN PATENTS

| | | |
|---|---|---|
| 224,399 | 10/1959 | Australia. |
| 517,882 | 3/1953 | Belgium. |

HARRY B. THORNTON, *Primary Examiner.*

S. SOKOLOFF, *Assistant Examiner.*